(12) United States Patent
Huh et al.

(10) Patent No.: US 12,607,588 B2
(45) Date of Patent: Apr. 21, 2026

(54) ZnO/CARBON ALLOTROPE COMPLEX FOR SENSING OF LOW PPM FORMALDEHYDE GAS AND MANUFACTURING METHOD THEREOF

(71) Applicant: Kyungpook National University Industry-Academic Cooperation Foundation, Daegu (KR)

(72) Inventors: Jeung Soo Huh, Daegu (KR); Jae Bum Park, Daegu (KR); Ji Hoon Lee, Siheung-si (KR)

(73) Assignee: Kyungpook National University Industry-Academic Cooperation Foundation, Daegu (KR)

( * ) Notice: Subject to any disclaimer, the term of this patent is extended or adjusted under 35 U.S.C. 154(b) by 203 days.

(21) Appl. No.: 18/241,180

(22) Filed: Aug. 31, 2023

(65) Prior Publication Data

US 2024/0068977 A1    Feb. 29, 2024

(30) Foreign Application Priority Data

Aug. 31, 2022    (KR) ........................ 10-2022-0110112

(51) Int. Cl.
*G01N 27/30*          (2006.01)
*G01N 27/407*        (2006.01)

(52) U.S. Cl.
CPC ....... *G01N 27/308* (2013.01); *G01N 27/4071* (2013.01); *G01N 27/4075* (2013.01)

(58) Field of Classification Search
CPC ............. G01N 27/308; G01N 27/4071; G01N 27/4075; G01N 27/127; G01N 27/125; G01N 33/0047; C01G 9/02; C01P 2004/16; C30B 7/14; C30B 29/16; C30B 29/60; B82Y 15/00; B82Y 25/00; B82Y 40/00
See application file for complete search history.

(56) References Cited

FOREIGN PATENT DOCUMENTS

KR          10-0959134 B1      5/2010

OTHER PUBLICATIONS

Yang et al., Fabrication of ZnO nanorods based gas sensor pattern by photolithography and lift off techniques, Journal of King Saud University-Science, 2021, 33, 101397 (Year: 2021).*
(Continued)

*Primary Examiner* — Shizhi Qian
(74) *Attorney, Agent, or Firm* — NSIP Law

(57) ABSTRACT

Disclosed is a ZnO/carbon allotrope composite for a formaldehyde sensor. The ZnO/carbon allotrope composite for a formaldehyde sensor comprising a substrate, a conductive metal coating layer formed on the substrate, a ZnO seed layer formed on the coating layer, ZnO nanorods grown from the ZnO seed layer, and a carbon allotrope layer formed on and overlapping with the nanorods. Also disclosed is a method for preparing a ZnO/carbon allotrope composite for a formaldehyde sensor. The method includes depositing a conductive metal coating layer on a substrate, sputtering Zn on the conductive metal coating layer to form a ZnO layer, followed by annealing to form ZnO seeds in the ZnO layer, growing ZnO nanorods from the ZnO seeds; and coating a carbon allotrope on the ZnO nanorods to form a carbon allotrope layer overlapping with the nanorods.

7 Claims, 13 Drawing Sheets

Type A

Type B

(56)     References Cited

OTHER PUBLICATIONS

Tsai et al., Morphological, material, and optical properties of ZnO/ZnS/CNTs nanocomposites on SiO2 substrate, Nanomaterials, 2020, 10, 1521 (Year: 2020).*

Chen et al., Enhanced formaldehyde gas sensing properties of ZnO nanosheets modified with graphene, Electron. Mater. Lett., 2017, 13(3), 270-276 (Year: 2017).*

Vatandoust et al., Fabrication of ZnO-MWCNT nanocomposite sensor and investigation of its ammonia gas sensing properties at room temperature, Synthetic Metals, 2021, 273, 116710 (Year: 2021).*

Schmidt-Mende et al., ZnO—nanostructures, defects, and devices, Materials today, 2007, 10, 40-48 (Year: 2007).*

Chen et al., Characteristics of ZnO nanorods-based ammonia gas sensors with a cross-linked configuration, Sensors and actuators B: Chemical, 2015, 221, 491-498 (Year: 2015).*

Li et al., Material characterizations and light/gas dual-sensing properties of ZnO nanorods incorporating buried carbon nanotube in the seed layer, Results in Physics, 2022, 39, 105783 (Year: 2022).*

Yi et al., Vertically aligned ZnO nanorods and graphene hybrid architectures for high-sensitive flexible gas sensors, Sensors and actuators B: Chemical, 2011, 155, 264-269 (Year: 2011).*

Huang et al., Incorporation of carbon nanotube and graphene in ZnO nanorods-based hydrogen gas sensor, Ceramics International , 2018, 44, 12308-12314. (Year: 2018).*

Lee, Jihoon "Comparison of Characteristics of ZnO Gas Sensor Using a Low-Dimensional Carbon Allotrope." *Department of Convergence & Fusion system Engineering Graduate School, Kyungpook National University Daegu*, Korea; (Jun. 2022).

* cited by examiner

Front Part                    Back Part

| ZnO Nano Rod |
| Low-dimensional carbon allotrope |
| ZnO seed |
| Pt coating |
| Alumina substrate |

Type A

| Low-dimensional carbon allotrope |
| ZnO Nano Rod |
| ZnO seed |
| Pt coating |
| Alumina substrate |

Type B

Fig. 7(a)

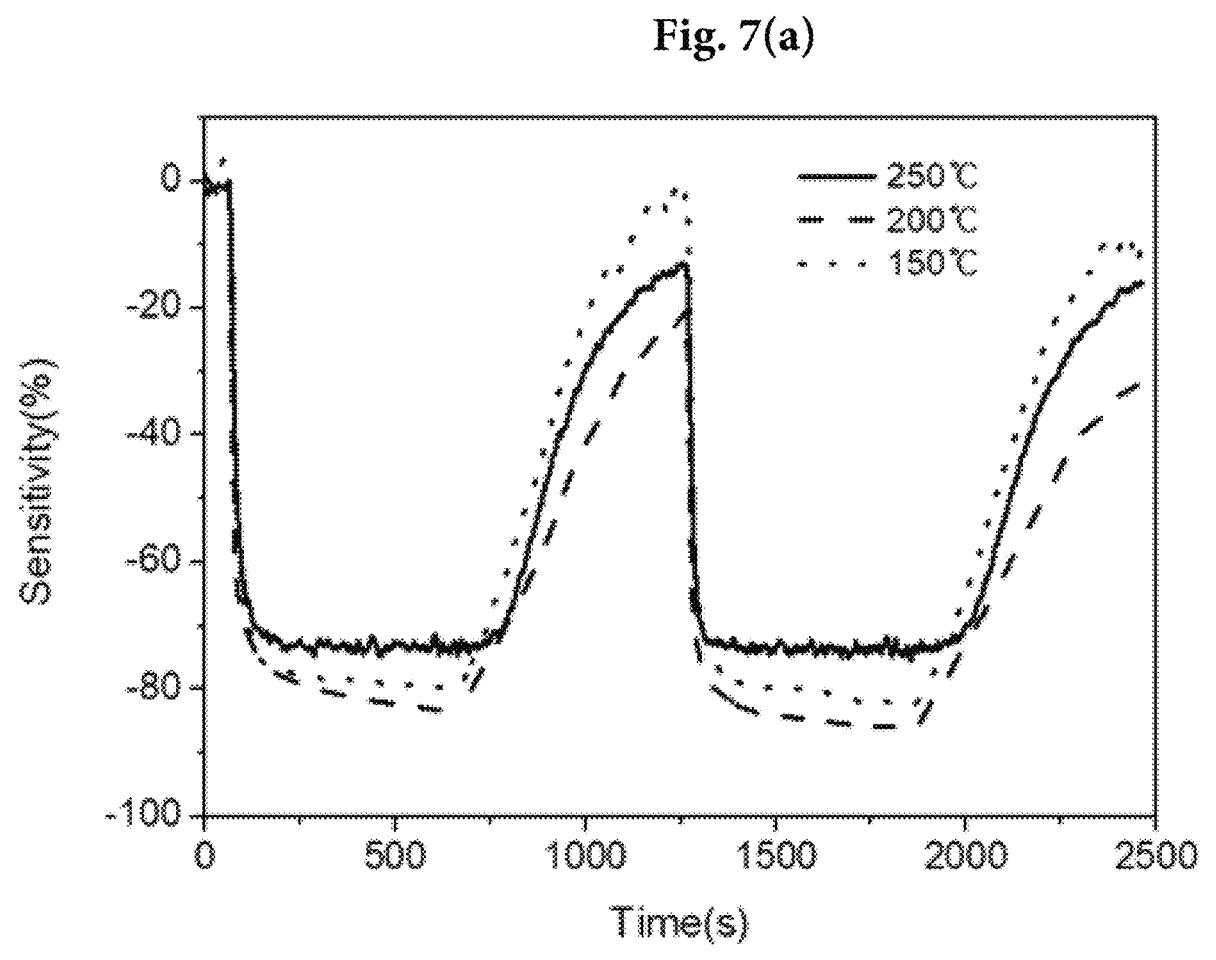

ZnO/CARBON ALLOTROPE COMPLEX FOR SENSING OF LOW PPM FORMALDEHYDE GAS AND MANUFACTURING METHOD THEREOF

CROSS-REFERENCE TO RELATED APPLICATIONS

This application claims the benefit under 35 USC § 119(a) of Korean Patent Application No. 10-2022-0110112, filed on Aug. 31, 2022, the entire disclosure of which is incorporated herein by reference for all purposes.

BACKGROUND OF THE INVENTION

1. Field of the Invention

The present invention relates to ZnO/carbon allotrope composites for gas sensors for low ppm concentrations of formaldehyde and methods for preparing the same. More specifically, the present invention relates to ZnO/carbon allotrope composites for gas sensors for low ppm concentrations of formaldehyde that are prepared using sonochemical synthesis and carbon allotrope spin coating, and methods for preparing the ZnO/carbon allotrope composites.

2. Description of the Related Art

In general, a gas sensor is composed of a material whose physical properties, including electrical resistance, capacitance, and permittivity, change when an explosive or toxic gas exists around the sensor. The rest of the gas sensor converts the degree of the change of physical properties into an electrical signal to sound an alarm so that people can be informed of the danger. Various types of gas sensors are commonly used, such as semiconductor type and catalytic combustion type. Semiconductor-type gas sensors are mostly used in places where small amounts of gases are used, such as at home.

Most semiconductor-type gas sensors use changes in surface electrical conductivity that occur when gas comes into contact with ceramic semiconductor surfaces. Such semiconductor-type gas sensors include $SnO_2$-, ZnO-, and $Fe_2O_3$-based gas sensors. Among these semiconductor-type gas sensors, ZnO-based gas sensors are the most studied and used. ZnO-based gas sensors are synthesized in the form of variously shaped nanostructures such as nanorods, nanoribbons, and nanowires whose sizes vary from several nanometers to hundreds of nanometers depending on their synthesis method and conditions. For example, thermal evaporation, pulsed laser deposition (PLD), metal organic chemical vapor deposition (MOCVD), and sputtering are used to prepare nanorods. Particularly, when various nanostructures are oriented in one direction, their specific surface area is greatly increased, enabling their application to various fields such as catalysts, gas sensors, and solar energy.

Methods for physical and chemical growth of ZnO not only involve a complicated process but also require a high growth temperature ($\geq 400°$ C.) and have many limitations in the growth of nanomaterials. Thus, hydrothermal methods are used to synthesize nanomaterials. Hydrothermal methods have advantages over conventional methods in that nanostructures can be grown at lower temperatures, process control is simpler, and nanostructures can be synthesized over a larger area. Despite these advantages, however, hydrothermal methods fail to overcome a major drawback in that it is not easy to control the regularity, directionality, size, and density of nanorods. Few studies on the applicability of ZnO nanorods grown for different times to sensors depending on growth time have been reported.

According to the present invention, ZnO nanostructures are synthesized using a sonochemical method rather than a hydrothermal method and are spin coated with low-dimensional carbon allotropes to prepare a composite. For example, the composite is composed of carbon nanotubes as the carbon allotropes and ZnO nanorods as the ZnO nanostructures. The carbon nanotubes and the ZnO nanorods have long tubular shapes. The composite can be used to fabricate a formaldehyde gas sensor with outstanding reliability and sensing characteristics as well as fast recoverability due to its high sensitivity to formaldehyde.

SUMMARY OF THE INVENTION

The present invention has been made in an effort to solve the above-described problems, and it is one object of the present invention to provide ZnO/carbon allotrope composites for formaldehyde sensors.

It is a further object of the present invention to provide gas sensors using the composites.

It is another object of the present invention to provide methods for preparing the composites.

One aspect of the present invention provides a ZnO/carbon allotrope composite for a formaldehyde sensor including a substrate, a conductive metal coating layer formed on the substrate, a ZnO seed layer formed on the coating layer, a carbon allotrope layer formed on the ZnO seeds, and ZnO nanorods grown through the carbon allotrope layer from the ZnO seed layer.

A further aspect of the present invention provides a ZnO/carbon allotrope composite for a formaldehyde sensor including a substrate, a conductive metal coating layer formed on the substrate, a ZnO seed layer formed on the coating layer, ZnO nanorods grown from the ZnO seed layer, and a carbon allotrope layer formed on and overlapping with the nanorods.

Another aspect of the present invention provides a gas sensor employing each of the ZnO/carbon allotrope composites for formaldehyde sensors.

Another aspect of the present invention provides a method for preparing a ZnO/carbon allotrope composite for a formaldehyde sensor, including depositing a conductive metal coating layer on a substrate (step 1), sputtering Zn on the conductive metal coating layer to form a ZnO layer, followed by annealing to form ZnO seeds in the ZnO layer (step 2), coating a carbon allotrope on the seed layer (step 3), and growing ZnO nanorods through the carbon allotrope layer from the ZnO seed layer (step 4).

Yet another aspect of the present invention provides a method for preparing a ZnO/carbon allotrope composite for a formaldehyde sensor, including depositing a conductive metal coating layer on a substrate (step 1), sputtering Zn on the conductive metal coating layer to form a ZnO layer, followed by annealing to form ZnO seeds in the ZnO layer (step 2), growing ZnO nanorods from the ZnO seeds (step 3), and coating a carbon allotrope on the ZnO nanorods to form a carbon allotrope layer overlapping with the nanorods (step 4).

The composites and the sensors of the present invention have excellent formaldehyde sensing characteristics, particularly at lower operating temperatures than general semiconductor gas sensors. In addition, the composites and the sensors of the present invention are highly sensitive to low ppm concentrations of formaldehyde and have improved recoverability.

BRIEF DESCRIPTION OF THE DRAWINGS

These and/or other aspects and advantages of the invention will become apparent and more readily appreciated from the following description of the embodiments, taken in conjunction with the accompanying drawings of which.

Figure 4A:
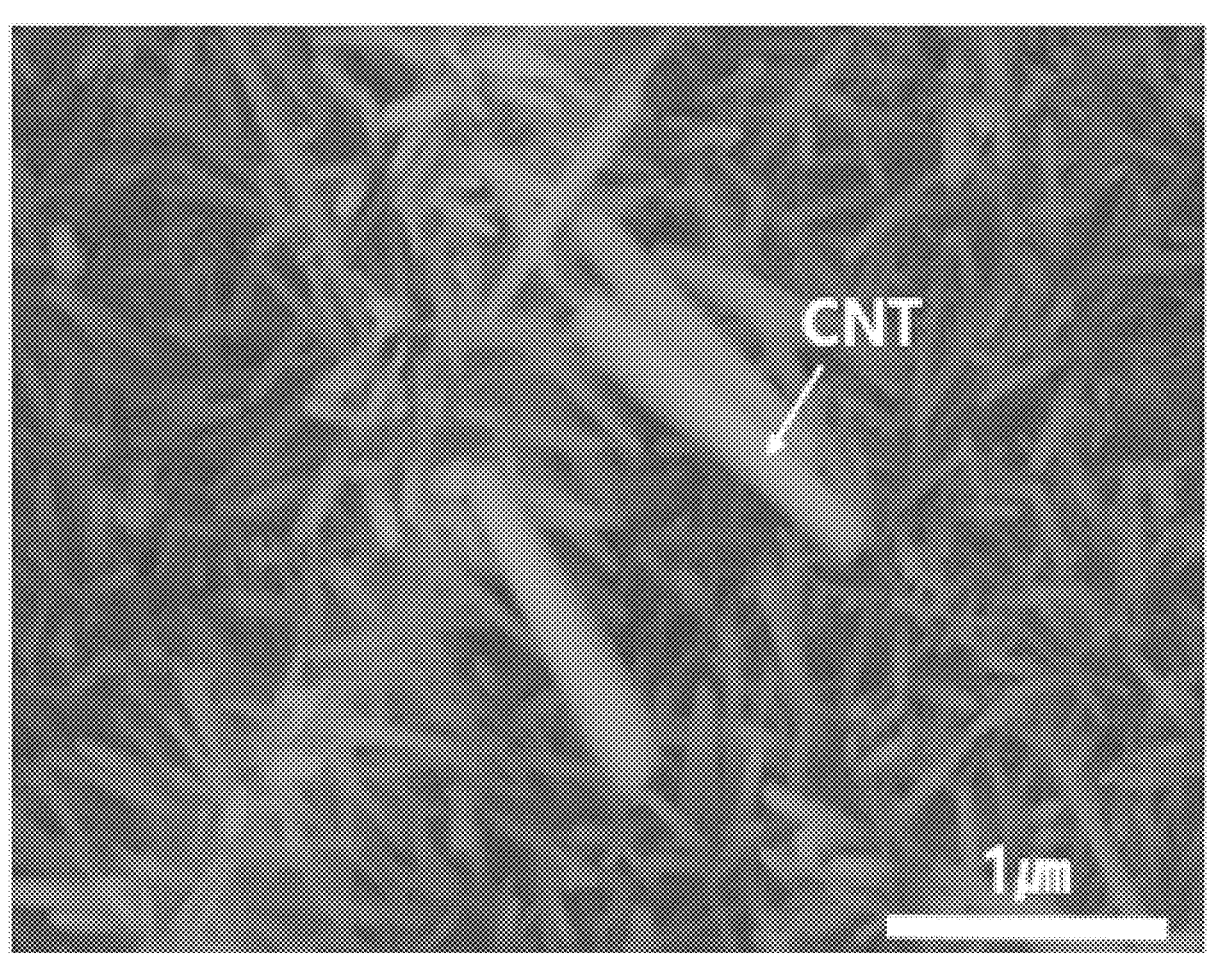
Figure 4B:
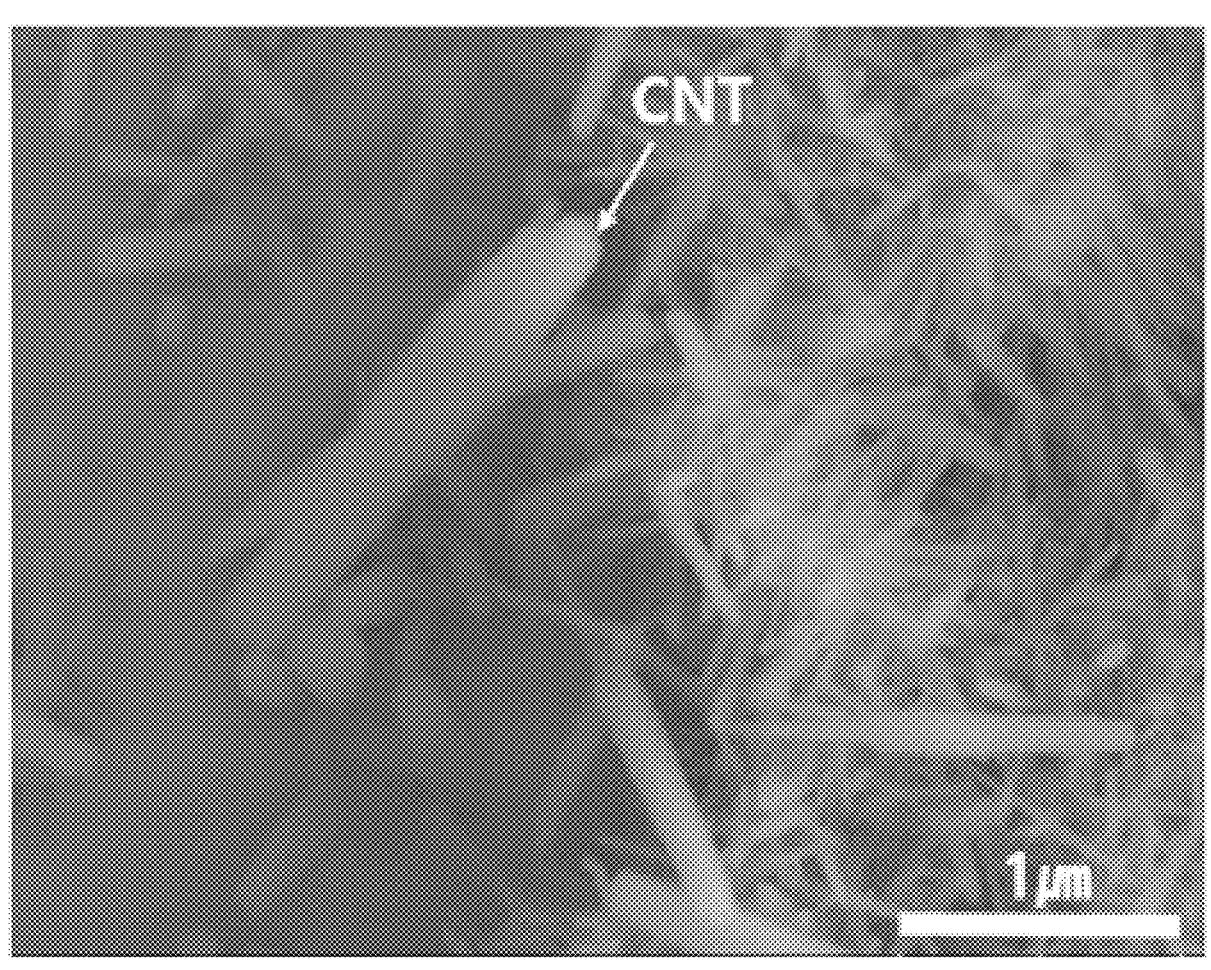
Figure 5:
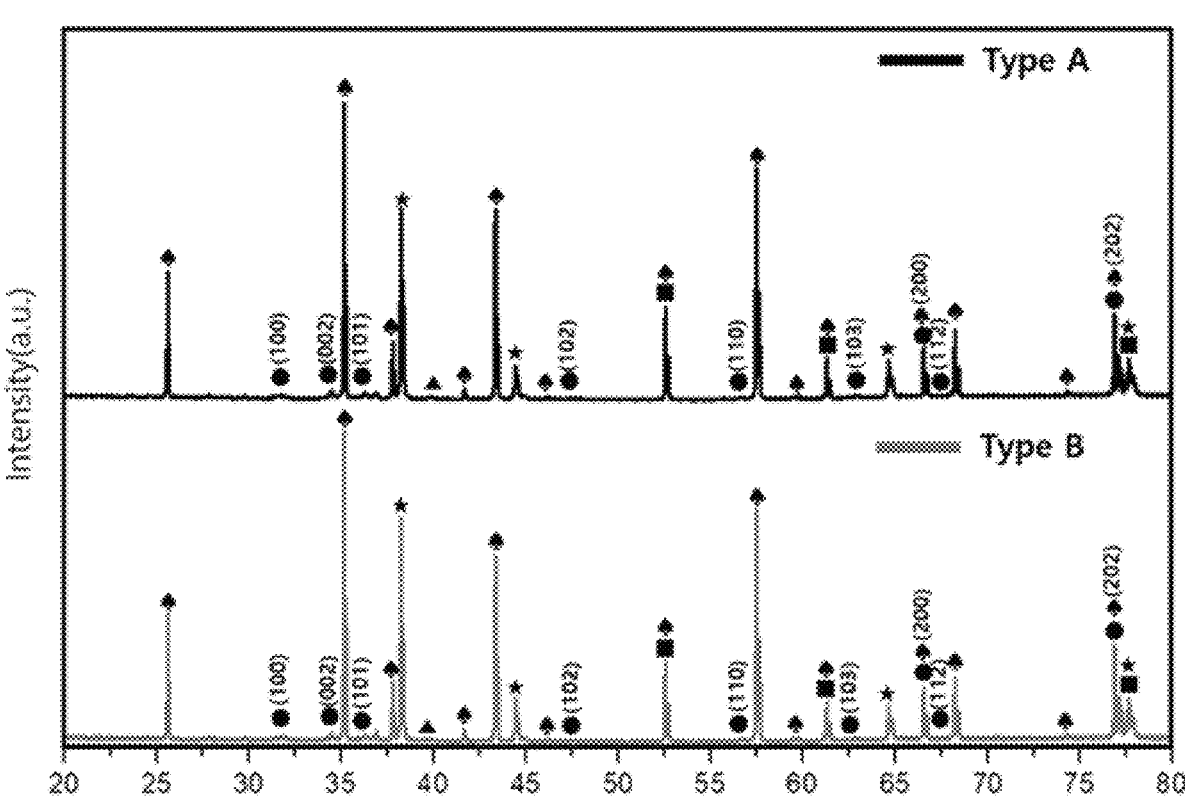
Figure 6A:
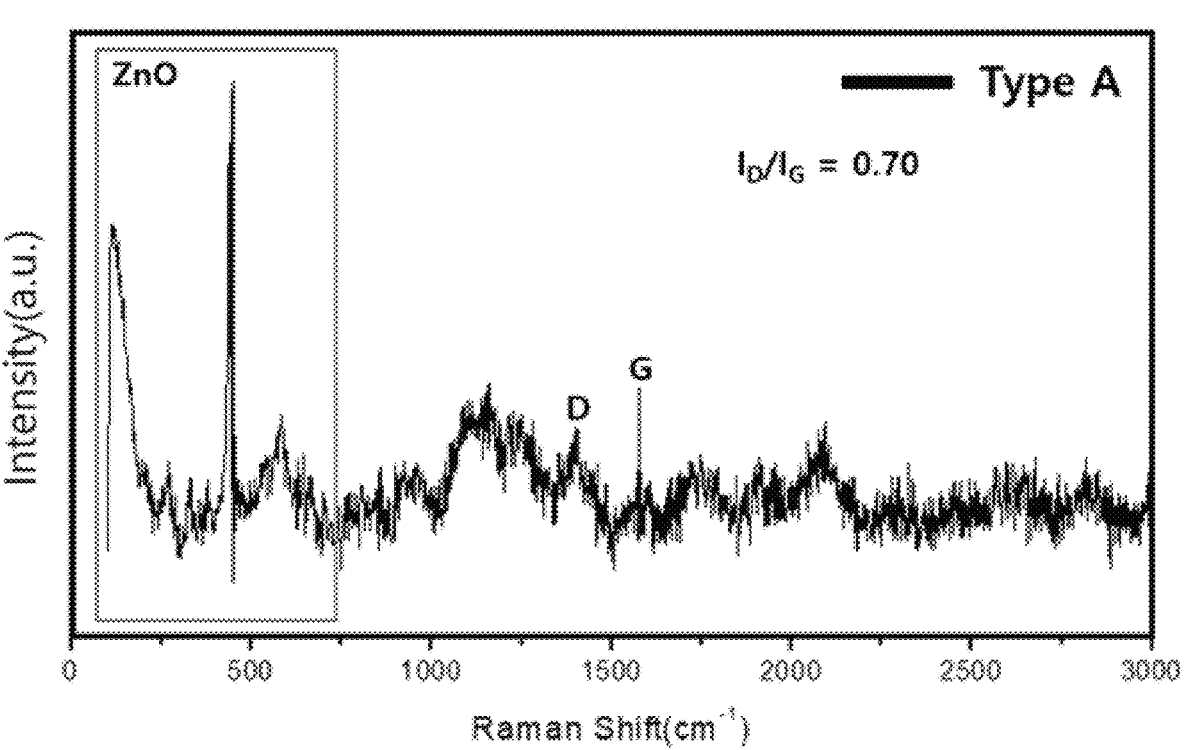
Figure 6B:
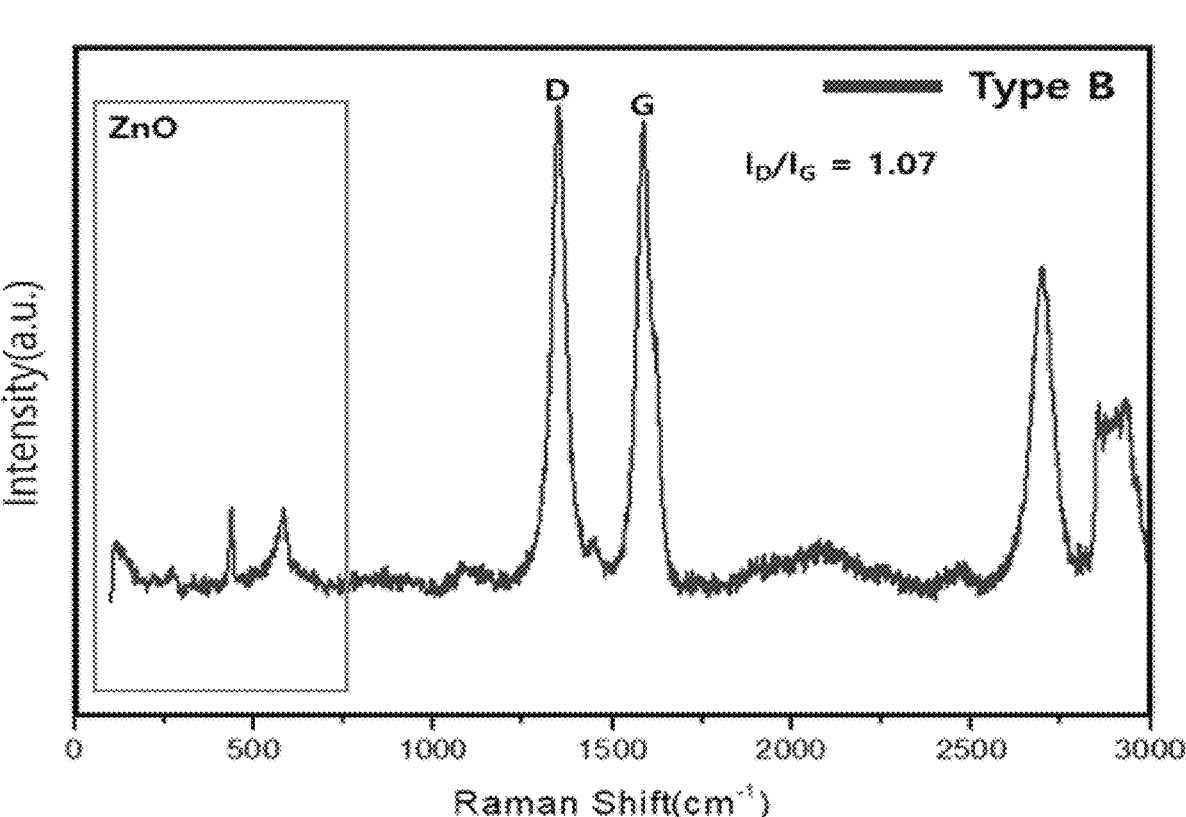
Figure 7B:
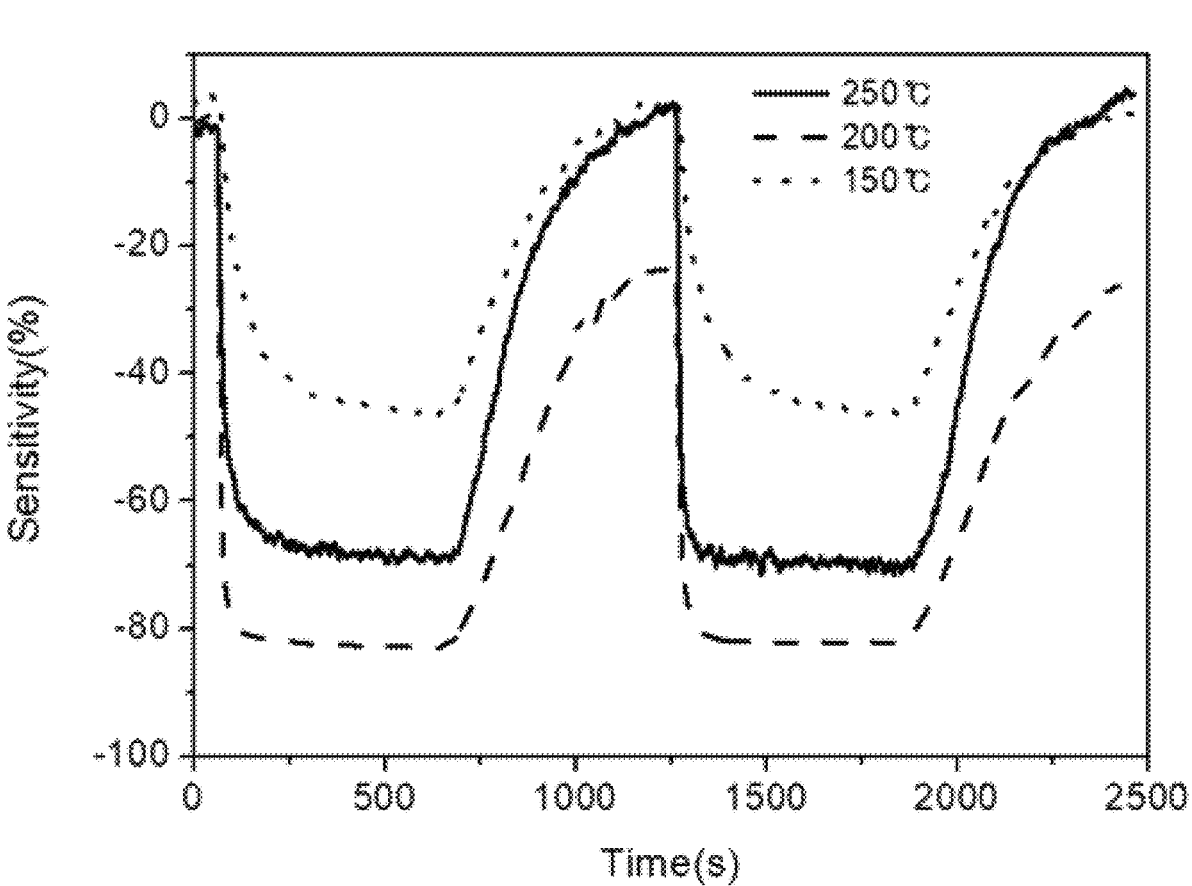
Figure 8A:
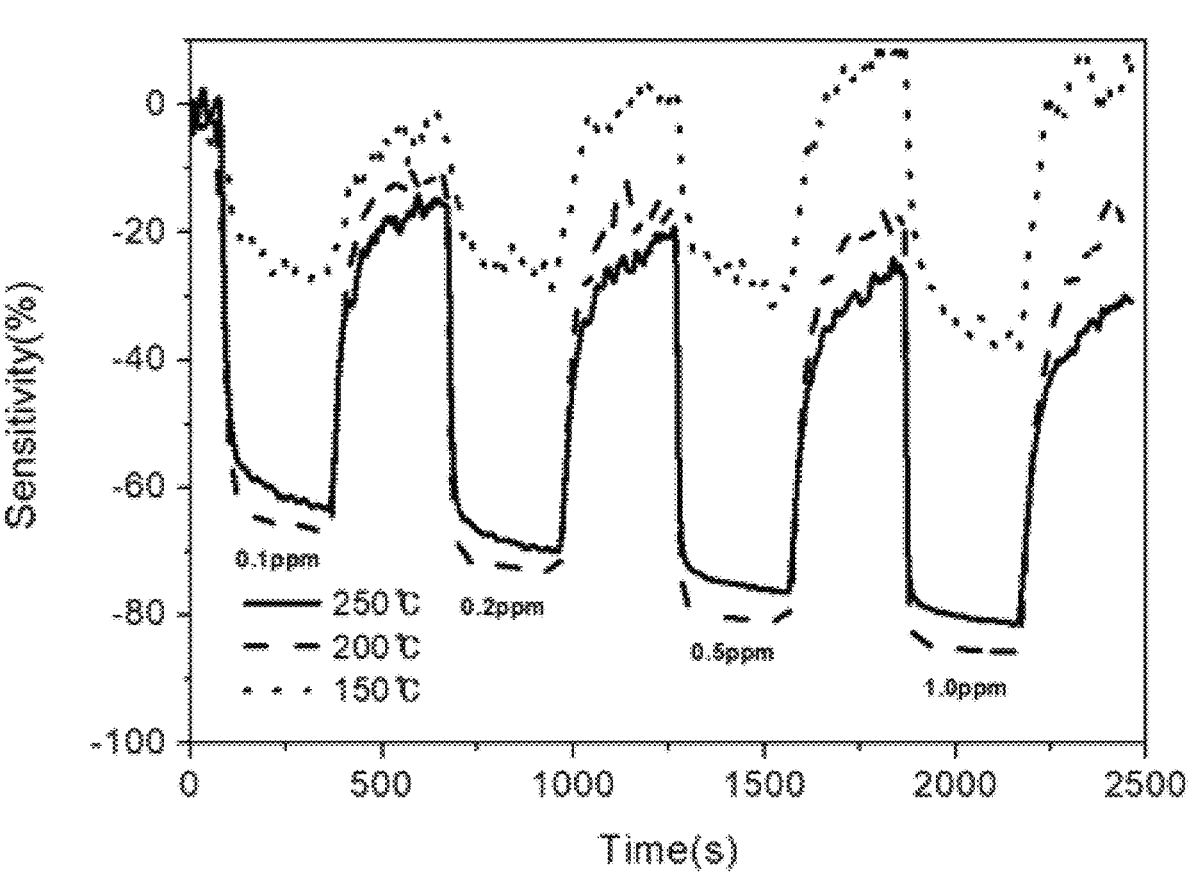
Figure 8B:
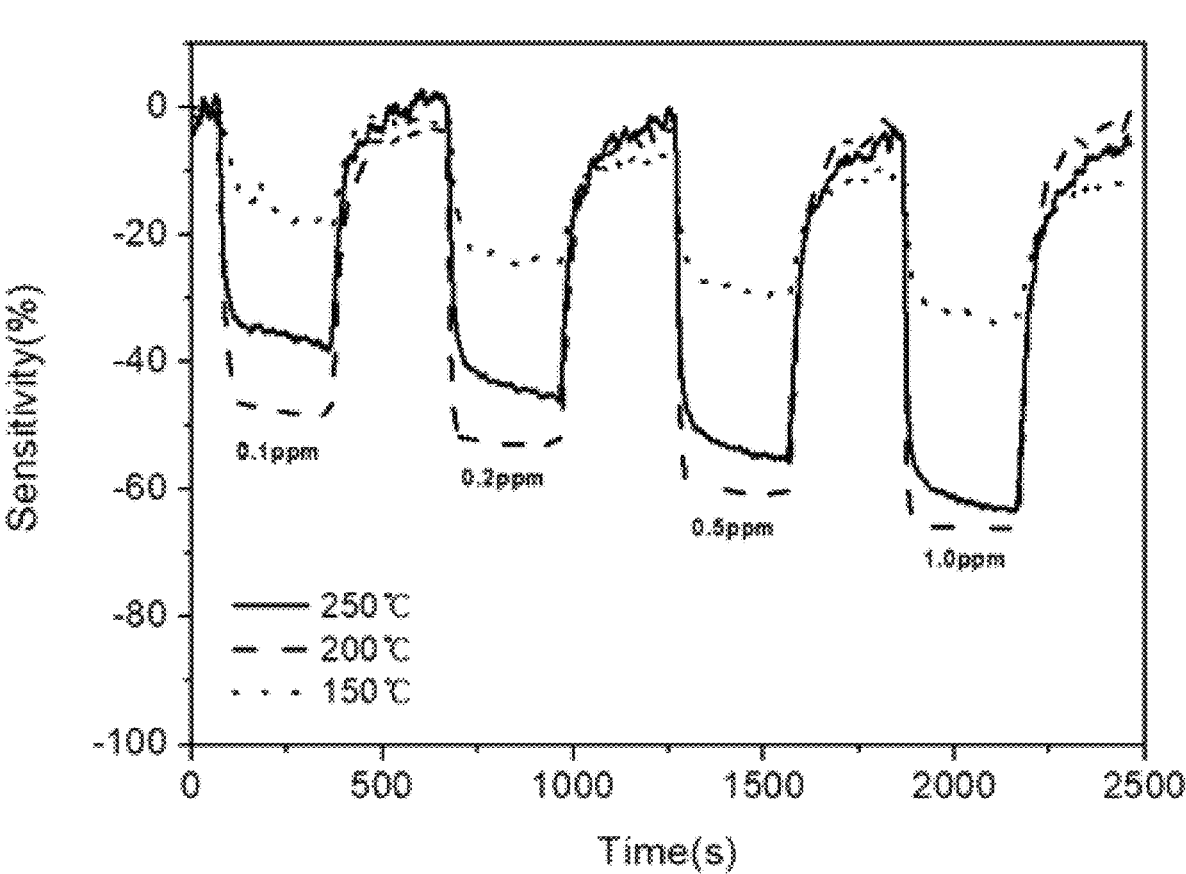
Figure 9:
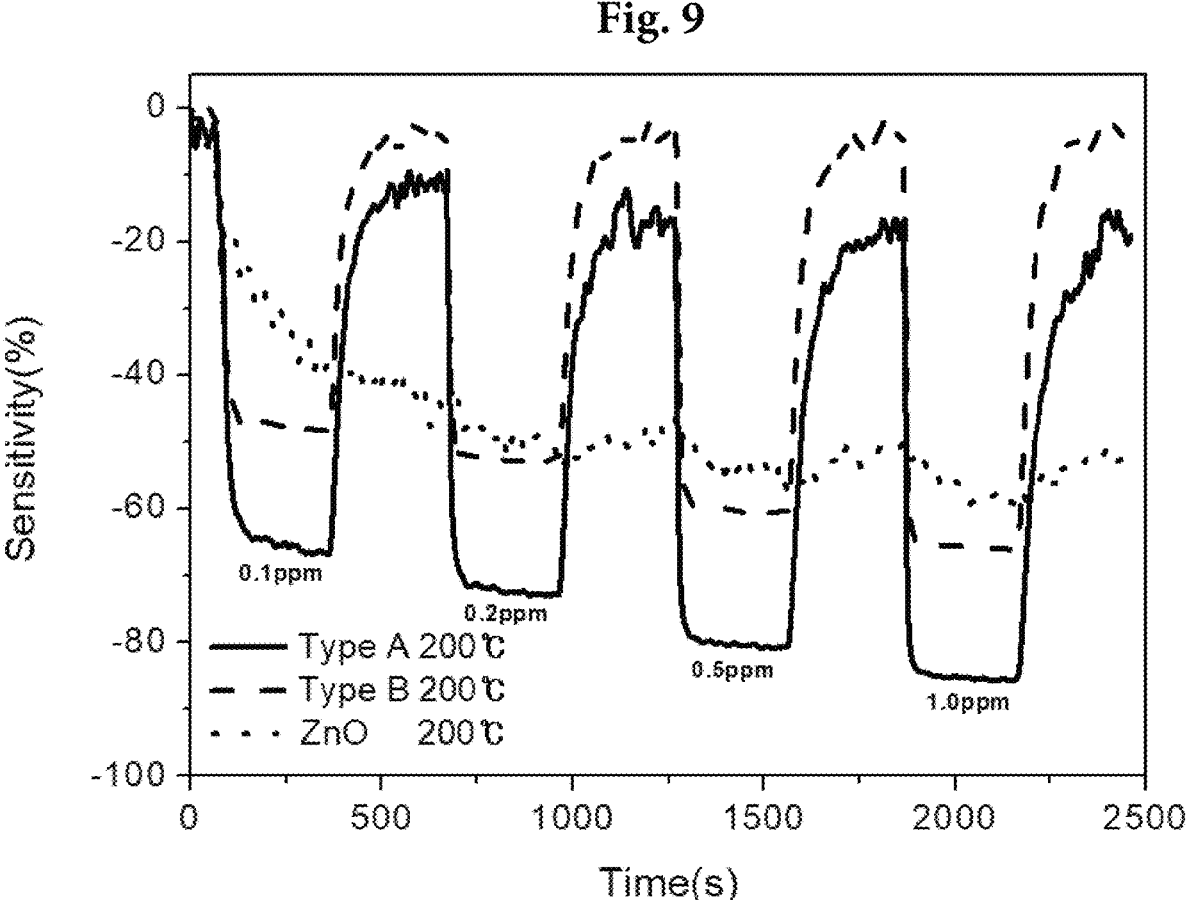

(a) and (b) of FIG. 4 show the results of surface analysis for sensors fabricated in Examples 1-2;

FIG. 5 shows the components and structures of sensors fabricated in Examples 1-2, which were analyzed using XRD;

(a) and (b) of FIG. 6 show the components and structures of sensors fabricated in Examples 1-2, which were analyzed using Raman spectroscopy;

(a) and (b) of FIG. 7 show the sensitivity and recovery at different temperatures for 20 ppm of formaldehyde for sensors fabricated in Examples 1-2;

(a) and (b) of FIG. 8 show the sensitivity and recovery at different temperatures for 1 ppm or less of formaldehyde for sensors fabricated in Examples 1-2; and FIG. 9 shows a comparison of sensitivity and recovery to formaldehyde between a ZnO sensor and ZnO/low-dimensional allotrope composite sensors fabricated in Examples 1-2.

DETAILED DESCRIPTION OF THE INVENTION

The present invention will now be described in more detail.

One aspect of the present invention provides a ZnO/carbon allotrope composite for a formaldehyde sensor including a substrate, a conductive metal coating layer formed on the substrate, a ZnO seed layer formed on the coating layer, a carbon allotrope layer formed on the ZnO seeds, and ZnO nanorods grown through the carbon allotrope layer from the ZnO seed layer.

The composite of the present invention includes ZnO and a carbon allotrope. In the present invention, two different types of composites are provided depending on whether spin coating of the carbon allotrope is performed before or after growth of ZnO nanorods. For convenience, the types of composites prepared by spin coating of the carbon allotrope before and after growth of the ZnO nanorods are referred to as "type A" and "type B", respectively. The composite described above is of type A and is characterized in that the carbon allotrope layer is formed on the ZnO seed layer before growth of the ZnO nanorods from the seed layer. The ZnO nanorods and the carbon allotrope have long tubular shapes. The carbon allotrope is a low-dimensional one that is composed of one or two carbon sheets. The carbon allotrope is intended to encompass carbon nanotubes (CNTs) and graphene.

Carbon nanotubes can be represented as allotropes of graphene having a two-dimensional structure. Carbon nanotubes have a hollow tubular shape with graphene walls.

Carbon nanotubes can be classified into single-walled carbon nanotubes (SWCNTs) and multi-walled carbon nanotubes (MWCNTs) and are divided into armchair, zigzag, and chiral types depending on their rolling angle. Armchair-type carbon nanotubes have metallic properties and zigzag type carbon nanotubes have semiconducting properties. Single-walled carbon nanotubes have a resistance of $\frac{1}{100}$ of that of copper and their ability to transport current is 1000 times that of copper. Graphene refers to a 2D, single-layer nanosheet of $sp^2$-hybridized carbon atoms forming a honeycomb lattice. Graphene is a new material with a very large specific surface area per volume and a high electrical conductivity. Graphene has a theoretical specific surface area of 2,600 $m^2g^{-1}$ and a theoretical electrical conductivity of $8\times10^5$ $SCm^{-1}$.

The substrate used in the type A composite of the present invention may be of any type as long as it can be coated with the metal coating layer. The metal coating layer may be of any type as long as the metal can impart conductivity to the composite, has a low resistance, and does not interfere with the conducting properties of ZnO and the carbon allotrope in the composite. Platinum (Pt) is used as the metal in the type A composite of the present invention.

The type A composite has a sensitivity of 60 to 90% to formaldehyde at a concentration in the range of 0.1 to 20 ppm at a sensing temperature of 150 to 250° C. Specifically, the type A composite has a sensitivity of 60 to 90% to formaldehyde at a concentration in the range of 0.1 to 1 ppm at 200 to 250° C. The type A composite has a sensitivity of 70 to 90% to formaldehyde at a concentration in the range of 1 to 20 ppm, preferably 10 to 20 ppm, most preferably 20 ppm, at 150 to 250° C. and a sensitivity of 80 to 90% at 150 to 200° C. The type A composite exhibits the highest recovery at 200 to 250° C. when the concentration of formaldehyde is 0.1 to 1 ppm, at 150 to 250° C., most preferably at 150° C. when the concentration of formaldehyde is 1 to 20 ppm, preferably 10 to 20 ppm, most preferably 20 ppm.

A further aspect of the present invention provides a ZnO/carbon allotrope composite for a formaldehyde sensor including a substrate, a conductive metal coating layer formed on the substrate, a ZnO seed layer formed on the coating layer, ZnO nanorods grown from the ZnO seed layer, and a carbon allotrope layer formed on and overlapping with the nanorods.

This type of composite corresponds to "type B" defined in the present invention and is characterized in that the carbon allotrope layer is formed after growth of the ZnO nanorods from the ZnO seed layer. The type B composite has a sensitivity of 60 to 90% to formaldehyde at a concentration in the range of 0.1 to 20 ppm at a sensing temperature of 200 to 250° C. Specifically, the type B composite has a sensitivity of 60 to 70% to formaldehyde at a concentration in the range of 0.1 to 1 ppm at 200 to 250° C. The type B composite has a sensitivity of 70 to 90% to formaldehyde at a concentration in the range of 1 to 20 ppm, preferably 10 to 20 ppm, most preferably 20 ppm, at 200 to 250° C. The type A composite exhibits the highest recovery at 200 to 250° C. when the concentration of formaldehyde is 0.1 to 1 ppm, at 150 to 250° C., most preferably at 150° C. and 250° C. when the concentration of formaldehyde is 1 to 20 ppm, preferably 10 to 20 ppm, most preferably 20 ppm.

The substrate used in the type B composite may be of any type as long as it can be coated with the metal coating layer. The metal coating layer may be of any type as long as the metal can impart conductivity to the composite, has a low resistance, and does not interfere with the conducting properties of ZnO and the carbon allotrope in the composite. Platinum (Pt) is used as the metal in the type B composite of the present invention.

Another aspect of the present invention provides a method for preparing a ZnO/carbon allotrope composite for a form- aldehyde sensor, including depositing a conductive metal coating layer on a substrate (step 1), sputtering Zn on the conductive metal coating layer to form a ZnO layer, fol- lowed by annealing to form ZnO seeds in the ZnO layer (step 2), coating a carbon allotrope on the seed layer (step 3), and growing ZnO nanorods through the carbon allotrope layer from the ZnO seed layer (step 4).

The ZnO/carbon allotrope composite may be of type A. In this case, the type A composite is prepared as follows. First, in step 1, a metal capable of imparting conductivity to the composite is deposited on a substrate using an ion coater. Next, in step 2, a 1000 Å thick Zn layer is deposited using a sputtering system to form Zn layer, followed by annealing at 500 to 700° C., most preferably at 600° C. for 30 to 90 minutes to convert the Zn layer into ZnO layer, and then to form ZnO seeds in the ZnO layer. Next, in step 3, a carbon allotrope is coated on the seed layer. The carbon allotrope is preferably a low-dimensional one. Specifically, a mixture solution of the low-dimensional carbon allotrope is spin- coated at 500 to 1500 rpm, preferably 800 to 1200 rpm.

Next, in step 4, ZnO nanorods are formed on the ZnO seed layer. In this step, ZnO nanorods grow through the carbon allotrope layer. ZnO nanostructures can be synthesized by various methods. These methods are largely classified into gas-phase synthesis and liquid-phase synthesis methods. Gas-phase synthesis methods were initially used for the synthesis of ZnO nanostructures and include chemical vapor deposition, organic metal chemical deposition, and pulsed laser deposition. Liquid-phase synthesis methods include hydrothermal synthesis and sonochemical synthesis. The method of the present invention employs sonochemical synthesis, which is one of the liquid-phase synthesis meth- ods. The sonochemical synthesis is a process performed at room temperature and atmospheric pressure and has the advantages of high economic efficiency, short reaction time, and high yield. In the present invention, a frequency ranging from 20 kHz to 100 MHz and 20 to 400,000 J of energy is applied to form ZnO nanorods. Thereafter, annealing is performed at 300 to 500° C. for 1 to 3 hours to fix the nanostructures.

Another aspect of the present invention provides a gas sensor employing the type A or type B composite for a gas sensor for low ppm concentrations of formaldehyde.

The formaldehyde concentration is 0.1 ppm to 50 ppm, preferably 1 to 50 ppm, more preferably 10 to 50 ppm, and still more preferably 20 to 50 ppm.

Yet another aspect of the present invention provides a method for preparing a ZnO/carbon allotrope composite for a formaldehyde sensor, including depositing a conductive metal coating layer on a substrate (step 1), sputtering Zn on the conductive metal coating layer to form a ZnO layer, followed by annealing to form ZnO seeds in the ZnO layer (step 2), growing ZnO nanorods from the ZnO seeds (step 3), and coating a carbon allotrope on the ZnO nanorods to form a carbon allotrope layer overlapping with the nanorods (step 4).

The ZnO/carbon allotrope composite may be of type B. In this case, the type B composite is prepared as follows. First, in step 1, a metal capable of imparting conductivity to the composite is deposited on a substrate using an ion coater. Next, in step 2, a 1000 Å thick Zn layer is deposited using a sputtering system to form Zn layer, followed by annealing at 500 to 700° C., most preferably at 600° C. for 30 to 90 minutes to convert the Zn layer into ZnO layer, and then to form ZnO seeds in the ZnO layer. Next, in step 3, sono- chemical synthesis is used to form ZnO nanorods in the ZnO seed layer. In this step, when ultrasonic waves are used, a frequency ranging from 20 KHz to 100 MHz and 20 to 400,000 J of energy is applied to form ZnO nanorods.

Next, in step 4, a carbon allotrope is coated on the ZnO nanorods to form a carbon allotrope layer. The carbon allotrope is preferably a low-dimensional one. Specifically, a mixture solution of the low-dimensional carbon allotrope is spin-coated at 500 to 1500 rpm, preferably 800 to 1200 rpm. The carbon allotrope layer is formed on the ZnO nanorods and overlaps with the nanorods. Thereafter, annealing is performed at 300 to 500° C. for 1 to 3 hours to fix the nanostructures.

Preferred embodiments of the present invention will be described in detail with reference to the accompanying drawings. Meanwhile, illustration and detailed description of the configuration, operation or effect that can be easily understood by those skilled in the art will be simplified or omitted, and portions related with the present invention will be mainly shown.

EXAMPLES

Example 1—Fabrication of Sensors

Figure 1:
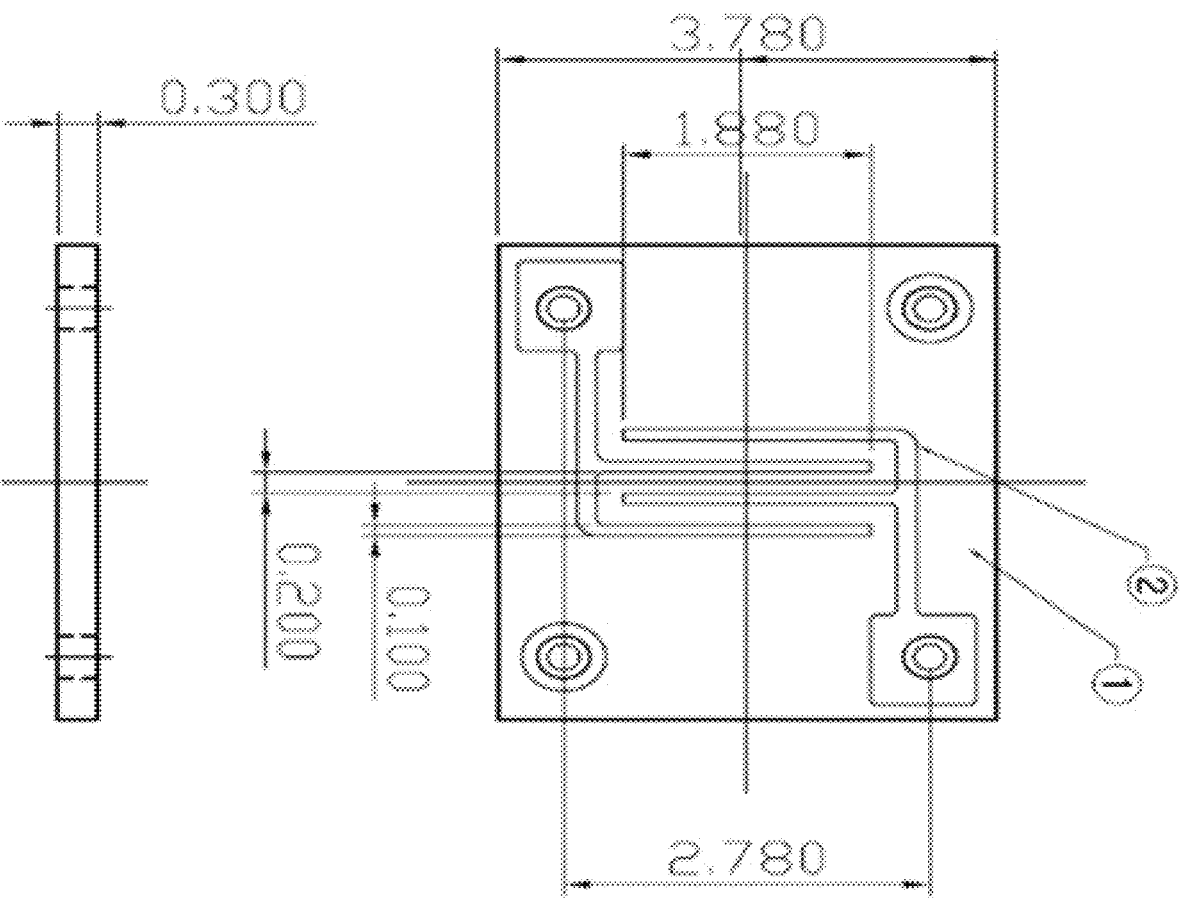
FIG. 1 is a configuration diagram of a sensor substrate used in Example 1.
Figure 2:
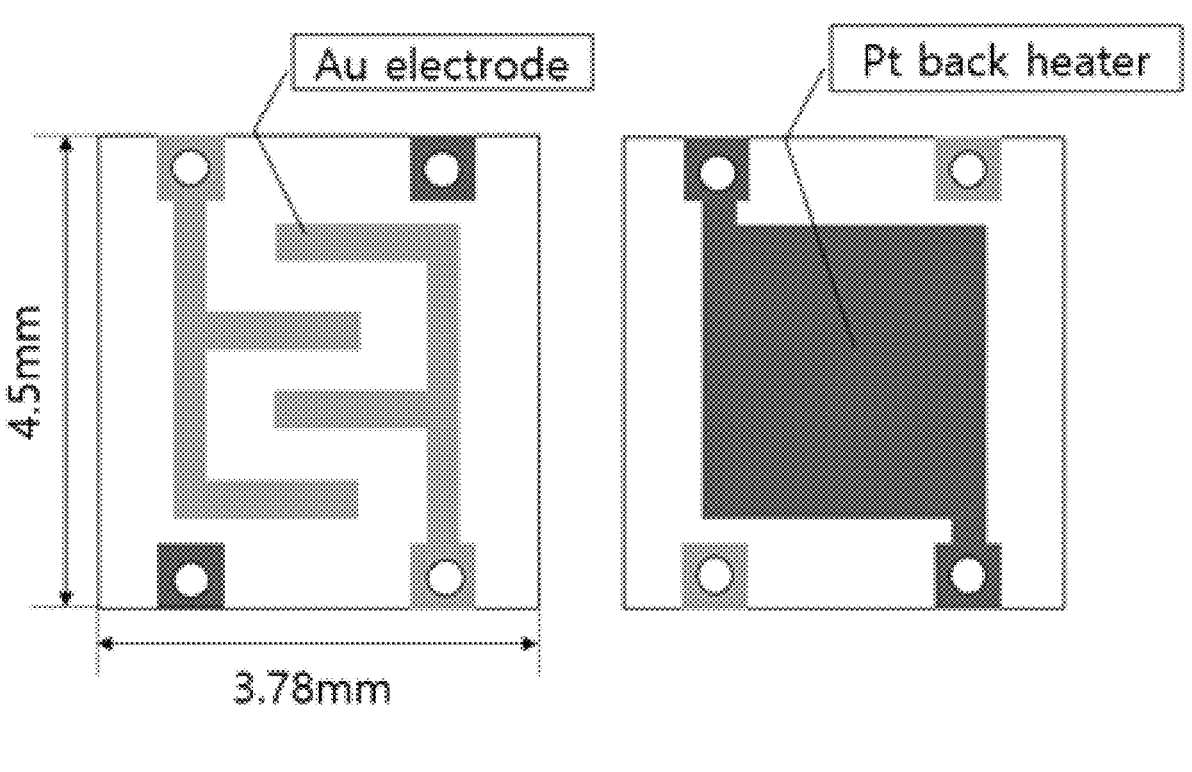
FIG. 2 shows front and rear side views of a sensor substrate used in Example 1.
Figure 3:
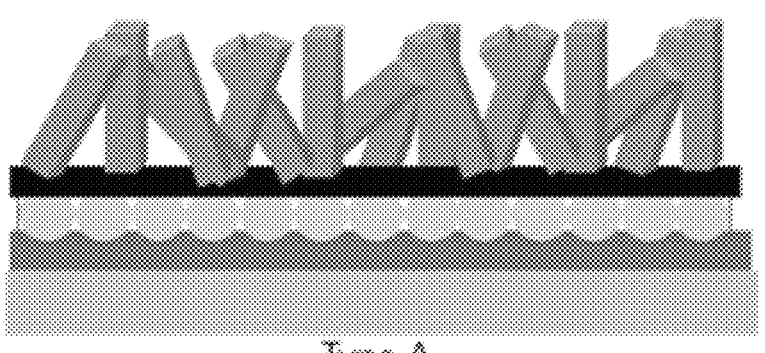
FIG. 3 schematically shows two types of composites according to exemplary embodiments of the present invention.
Figure 3:
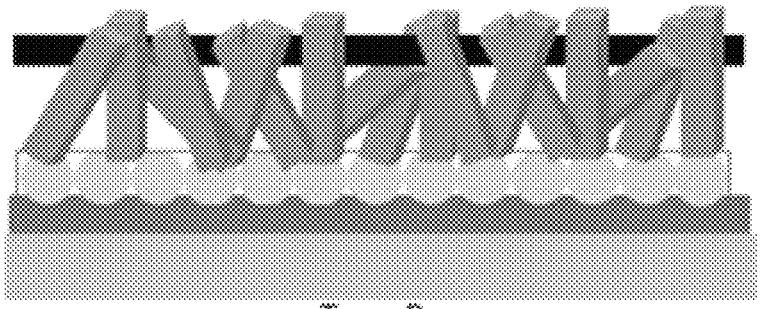

Sensors with dimensions of 3.78 mm×4.5 mm×0.3 mm were fabricated. Each of the sensors had an Au-coated front side (sensor part) and a Pt-coated rear side (heater part). FIG. 1 is a configuration diagram of a sensor substrate used in the sensor and FIG. 2 shows front and rear side views of the sensor substrate.

Example 2—Fabrication of ZnO/Low-Dimensional Carbon Allotrope Composite Gas Sensors ZnO/low-dimensional carbon allotrope composite sensors were fabricated as follows. Following a basic method for preparing ZnO nanostructures, it was intended to addition- ally benefit from the effects of graphene with a very large specific surface area per volume and a high electrical con- ductivity. The low-dimensional carbon composite was diluted with graphene carbon nanotubes 6 wt % in water dispersion (US Research Nanomaterials. Inc.)/distilled water mixtures in various ratios.

The basic method essentially includes pretreatment, sono- chemical synthesis, and post-treatment steps. In the pretreat- ment step, Pt was deposited on an alumina substrate using an ion coater at 20 mA for 60 sec, a 1000 Å thick Zn layer was deposited using sputtering equipment, and annealing was performed at 600° C. for 1 h to convert the Zn layer into ZnO layer, and then to form ZnO seeds in the ZnO layer. In the next sonochemical synthesis step, a 0.01 M aqueous solution of distilled water-based zinc nitrate hydrate $(Zn(NO_3)_2 \cdot 6H_2O)$ and hexamethylene tetramine $(C_6H_{12}N_4)$ was prepared. Thereafter, a sensor where the ZnO seeds were formed was fixed in the aqueous solution, followed by ultrasonic syn- thesis. In the post-treatment step, annealing was performed at 400° C. for 2 h to fix the formed nanostructures.

Based on this, type A and type B gas sensors were fabricated. The type A gas sensor was fabricated by spin coating of a 0.1 ml graphene and CNT mixture of a 0.1 mg/ml concentration on the ZnO seeds formed in the pre- treatment step at 1000 rpm twice, followed by ultrasonic synthesis and post-treatment. The type B gas sensor was fabricated by spin coating of a 0.1 ml graphene and CNT mixture of a 0.1 mg/ml concentration on the ZnO nanostructure sensor having undergone post-treatment at 1000 rpm twice.

In this experiment, 750 W ultrasonic synthesis equipment (Sonic & Materials, Inc.) was used. The tip size of the ultrasonic device was ½ an inch. An ultrasonic frequency of 20 kHz and 300,000 J of energy was applied. After ultrasonic synthesis, foreign materials were carefully cleaned off and the heater and the electrode of the sensor were connected to each other.

Example 3—Analysis of Sensitivity and Recovery of the Composite Gas Sensors

In this study, measurement equipment using the fabricated sensors was composed of a power supply, a mass flow controller (MFC), a data acquisition board (DAQ), a test chamber, an air gas, and a target gas. To measure the sensitivity and recovery of the fabricated sensors, each sensor was assembled with an electrode and a heater in the test chamber. Thereafter, a constant voltage was applied from the power supply to the heater of the sensor to adjust the surface temperature of the sensor to a preset value.

To stabilize the temperature of the sensor after application of the voltage, air was injected for 1 h to create an air atmosphere in the test chamber. Thereafter, the target gas was injected at the indicated times and changes in the value measured in the DAQ were observed using a LABVIEW program.

The sensitivity (S) was calculated according to Equation 1:

$$S\ (\%) = ((R_{gas} - R_{air})/(R_{air})) \times 100 \qquad (1)$$

where $R_{air}$ is the resistance value in the state stabilized by the air atmosphere created in the test chamber and $R_{gas}$ is the resistance value changed after injection of the target gas.

A series of processes consisting of stabilization in an air state for 1 h after application of the voltage, injection of the target gas for 10 min, and recovery for 10 min were carried out before evaluating the characteristics of the sensor.

Comparative Example 1—Measurement of Sensitivity of ZnO Sensor

The sensitivity and recovery of a ZnO sensor were measured in the same manner as in Example 3.

EXPERIMENTAL EXAMPLES

Experimental Example 1—Surface Analysis

The surfaces of the two type sensors fabricated in Examples 1 and 2 were analyzed by field emission scanning electron microscopy (FE-SEM).

Experimental Example 2—Analysis of Components and Structures of the Sensors

The components and structures of the two type sensors fabricated in Examples 1 and 2 were analyzed through X-ray diffraction (XRD).

Results and Discussion
Surface Analysis (a) and (b) of FIG. 4 show the results of surface analysis for the sensors. (a) and (b) of FIG. 4 show FE-SEM images of the type A and type B sensors, respectively. Referring to FIG. 4, the same long tubular CNTs and ZnO nanorods were observed in both type A and type B sensors. Graphene and CNTs overlapped with the ZnO nanorods in the type B sensor.

Analysis of Components and Structures

FIG. 5 shows the components and structures of the sensors, which were analyzed using XRD. Referring to FIG. 5, the plane directions of ZnO growth were (1 0 0), (0 0 2), (1 0 1), (1 0 2), (1 1 0), (1 0 3), (1 1 2), (2 0 0), and (2 0 2). These results confirmed the crystallinity of ZnO, which is expected to affect the sensitivity characteristics. In FIG. 5, ♠, ★, ●, ■, and ▲ indicate $Al_2O_3$Pt, Au, ZnO, C, and Pt and the components indicated by each peak are shown.

(a) and (b) of FIG. 6 show the components and structures of the sensors, which were analyzed using Raman spectroscopy. Referring to (a) and (b) of FIG. 6, the peaks at 437 $cm^{-1}$, 520 $cm^{-1}$, and 570 $cm^{-1}$ confirm the existence of ZnO. In the Raman analysis, the crystallinity of CNT and graphene can be evaluated using the D and G band intensity ratio, $I_d/I_g$. The lower the ratio, the higher the crystallinity, and the higher the ratio, the lower the crystallinity owing to the increase in the amount of non-crystallized carbon. The value of $I_d/I_g$ for type A was 0.70, which is lower than that for the type B value 1.07.

Analysis of Sensitivity and Recovery (1) Difference in Sensitivity to 20 ppm of Formaldehyde when the Carbon Allotrope was Spin Coated in Different Orders (a) and (b) of FIG. 7 show the sensitivity and recovery at different temperatures for 20 ppm of formaldehyde for the sensors. The blue, red, and black lines indicate 150° C., 200° C., and 250° C., respectively. Referring to (a) and (b) of FIG. 7, 20 ppm or less of formaldehyde was detected by both type A sensor (a) and type B sensor (b). The type A sensor appeared to have overall fast sensing characteristics with rapid changes regardless of temperature when the target gas was injected. In contrast, the type B showed a sensitivity of only 45% at 150° C. when the target gas was injected and showed modest changes from 65% at 250° C. unlike the type A. However, the rapid change and maintenance of the sensitivity of the type B at 200° C. was different from the tendency of the type A to decrease slowly after a certain value. When both sensitivity and recovery were taken into comprehensive consideration, the type B stably showed the best properties at 250° C. even when repeated twice and the type A showed the highest sensitivity at 200° C. and the highest recovery at 150° C.

(2) Comparison of Differences in Sensitivity and Recovery of the Sensors for 20 Ppm of Formaldehyde at Different Temperatures The type B showed a low sensitivity at 150° C. and the type A showed a good performance at 150° C. The type A was recovered to its original state (100%) after the first cycle but recovered to about 90% of its original state after the second cycle. Both type A and type B showed high sensitivities at 200° C. However, a rapid response was found in the type B and the recovery was similar in the type A and type B. The type B showed a lower sensitivity and a higher recovery at 250° C. than the type A. The type B was recovered faster when the target gas injection was stopped. The high sensitivity and low recovery at 200° C. can be explained by formaldehyde gas that diffuses between the nanorods with an increased specific surface area but cannot escape. The sensitivity and recovery at 150° C. are responsible for the adsorption and desorption of a larger amount of formaldehyde gas outside the nanorods than between the nanorods. The higher recovery at 250° C. was because the high temperature affected the diffusion of formaldehyde gas despite the adsorption and desorption between the nanorods.

(3) Comparison of Differences in Sensitivity and Recovery of the Different Types of Sensors for 1 ppm or Less of Formaldehyde (a) and (b) of FIG. 8 show the sensitivity and recovery at different temperatures for 1 ppm or less of formaldehyde for the sensors fabricated in Examples 1-2. Experiments were conducted in the order of 0.1 ppm, 0.2 ppm, 0.5 ppm, and 1 ppm. In (a) and (b) of FIG. 8, the lines indicate 150° C., 200° C., and 250° C., respectively.

Referring to (a) and (b) of FIG. 8, formaldehyde was detected by both type A sensor (a) and type B sensor (b) from 0.1 ppm. The similarity between the two sensors was that the change in the resistance change in the resistor increased as the concentration of formaldehyde increased. The highest sensitivity was exhibited by the type A at 200° C., and the highest recovery power was exhibited by the type B at 200 and 250° C. The combination of a good sensitivity and recovery was found to be at 200° C. for the type B. At 150° C., both the sensors exhibited a low sensitivity and an unstable graph for their recovery and sensitivity. In terms of the sensitivity toward formaldehyde, 200° C. was found to be a suitable operating temperature for both types, A and B. In terms of the recovery, the type B showed a good performance at 200 and 250° C. for low concentrations and a good performance at 250° C. at high concentrations.

(4) Comparison with the ZnO Sensor

FIG. 9 shows a comparison of sensitivity and recovery to formaldehyde between the ZnO sensor and the ZnO/low-dimensional allotrope composite sensors. Referring to FIG. 9, sensitivities were shown when formaldehyde was injected into the ZnO sensor, the type A sensor, and the type B sensor. The ZnO sensor showed low sensitivity and recovery compared to the type A and type B sensors. As the ppm of formaldehyde injected increased, the sensitivity was lowered but the difference was insignificant and the recovery was also insignificant. The reason for these characteristics is believed to be because the ZnO sensor has an operating temperature lower than temperatures at which the characteristics of ZnO semiconductor gas sensors as basic metal oxide gas sensors are shown, and as a result, it does not allow the movement of free electrons, resulting in insufficient adsorption and desorption of formaldehyde, unlike the type A and type B sensors.

The sensor composed essentially of ZnO only had excellent sensing characteristics at a high temperature of 350° C.

The foregoing has outlined rather broadly the features and technical advantages of the present invention so that those skilled in the art can better understand the claims that follow. It will be understood by those skilled in the art that the invention can be implemented in other specific forms without changing the spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A ZnO/carbon allotrope composite for a formaldehyde sensor comprising:

a substrate;

a conductive metal coating layer disposed on the substrate;

a ZnO seed layer disposed on the conductive metal coating layer;

a carbon allotrope layer disposed on the ZnO seed layer; and

ZnO nanorods extending from the ZnO seed layer, passing through the carbon allotrope layer, and disposed on the carbon allotrope layer.

2. The ZnO/carbon allotrope composite according to claim 1, wherein the ZnO nanorods have a tubular shape.

3. A formaldehyde sensor comprising the ZnO/carbon allotrope composite according to claim 1.

4. A method for preparing a ZnO/carbon allotrope composite for a formaldehyde sensor, comprising:

depositing a conductive metal coating layer on a substrate;

sputtering Zn on the conductive metal coating layer to form a Zn layer, followed by annealing the Zn layer to convert into a ZnO layer, and then to form ZnO seeds in the ZnO layer;

coating a carbon allotrope on the ZnO seeds to form a carbon allotrope layer; and growing ZnO nanorods from the ZnO seeds such that the ZnO nanorods extend from the ZnO seeds, passing through the carbon allotrope layer, and disposed on the carbon allotrope layer.

5. The method according to claim 4, wherein the annealing is performed at 500 to 700° C.

6. A method for preparing a ZnO/carbon allotrope composite for a formaldehyde sensor, comprising:

depositing a conductive metal coating layer on a substrate;

sputtering Zn on the conductive metal coating layer to form a Zn layer, followed by annealing the Zn layer to convert into a ZnO layer, and then to form ZnO seeds in the ZnO layer;

growing ZnO nanorods from the ZnO seeds such that the ZnO nanorods extend from the ZnO seeds; and coating a carbon allotrope on the ZnO nanorods to form a carbon allotrope layer such that at least a portion of the ZnO nanorods pass through the carbon allotrope layer and disposed on the carbon allotrope layer.

7. The method according to claim 6, wherein the annealing is performed at 500 to 700° C.

* * * * *